(12) United States Patent
Kamekawa

(10) Patent No.: US 8,503,004 B2
(45) Date of Patent: Aug. 6, 2013

(54) APPENDING RESTRICTION INFORMATION TO A JOB BEFORE TRANSMISSION

(75) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 12/918,936

(22) PCT Filed: Mar. 25, 2009

(86) PCT No.: PCT/JP2009/056767
§ 371 (c)(1),
(2), (4) Date: Aug. 23, 2010

(87) PCT Pub. No.: WO2009/130980
PCT Pub. Date: Oct. 29, 2009

(65) Prior Publication Data
US 2010/0328723 A1    Dec. 30, 2010

(30) Foreign Application Priority Data

Apr. 23, 2008    (JP) ................. 2008-113228

(51) Int. Cl.
*G06K 15/00*    (2006.01)

(52) U.S. Cl.
USPC ........................ 358/1.14; 358/1.15

(58) Field of Classification Search
USPC .............................. 358/1.14, 1.15
See application file for complete search history.

(56) References Cited

U.S. PATENT DOCUMENTS

| | | | | |
|---|---|---|---|---|
| 2003/0093298 A1* | 5/2003 | Hernandez et al. | ............... | 705/2 |
| 2006/0061792 A1* | 3/2006 | Kim et al. | ................... | 358/1.13 |
| 2006/0256364 A1* | 11/2006 | Yamamoto | .................. | 358/1.14 |
| 2007/0035765 A1* | 2/2007 | Corona | ........................ | 358/1.15 |
| 2007/0050368 A1 | 3/2007 | Watanabe | | |
| 2007/0118735 A1* | 5/2007 | Cherrington et al. | ......... | 713/155 |
| 2007/0283414 A1 | 12/2007 | Sugiyama | | |
| 2009/0116060 A1 | 5/2009 | Yamamichi | | |
| 2010/0149570 A1 | 6/2010 | Kamiya | | |

FOREIGN PATENT DOCUMENTS

| | | |
|---|---|---|
| JP | 2000-122766 | 4/2000 |
| JP | 2005-333561 A | 12/2005 |
| JP | 2006-050538 | 2/2006 |
| JP | 2007-058567 | 3/2007 |
| JP | 2007-095034 | 4/2007 |
| JP | 2007-323324 A | 12/2007 |
| JP | 2008-098784 A | 4/2008 |

OTHER PUBLICATIONS

International Search Report in PCT/JP2009/056767, dated Jul. 14, 2009.

* cited by examiner

*Primary Examiner* — Eric A Rust
(74) *Attorney, Agent, or Firm* — Fitzpatrick, Cella, Harper & Scinto

(57) ABSTRACT

A system accurately performs function restriction on a user-by-user basis, even in the case of an image processing function that is realizable with use of a plurality of apparatuses. To accomplish this, the image processing system includes a user restriction information management apparatus that has function restriction information and an image processing apparatus that has related restriction information. The image processing apparatus performs a user-designated function based on restriction content of the function restriction information and the related restriction information. There are cases where a restriction function, which is a function that is restricted by the function restriction information, can be realized by combining a plurality of other functions that are different from the restriction function, and related restriction information refers to information for restricting the usage of such other functions.

8 Claims, 11 Drawing Sheets

| RESTRICTION FUNCTION NAME (501) | RESTRICTION PROCESS NAME (502) | ENABLE / DISABLE (503) | TARGET FORMAT (504) | RESTRICTION CONTENT (505) | | | |
|---|---|---|---|---|---|---|---|
| | | | | PRINTING DISABLED | EDITING DISABLED | PASSWORD FIXED | |
| COPY | SEND | ENABLE | PDF | PRINTING DISABLED | EDITING DISABLED | PASSWORD FIXED | ~511 |
| COPY | SEND | DISABLE | TIFF.JPEG | – | – | – | ~512 |
| COPY | FAX | DISABLE | – | – | – | – | ~513 |

500

F I G. 3
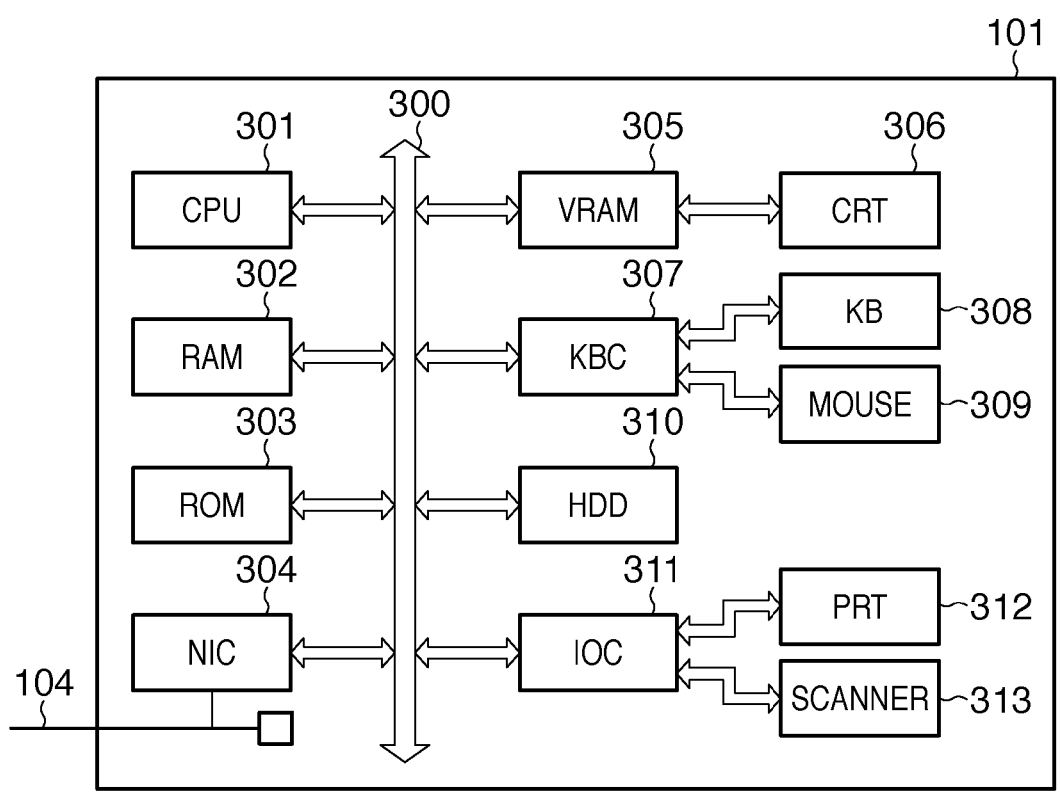

FIG. 4

| USERNAME | COPY | SCAN | SEND | FAX |
|---|---|---|---|---|
| USER A | ○ | ○ | ○ | ○ |
| USER B | ○ | ○ | × | ○ |
| USER C | ○ | ○ | ○ | × |
| USER D | × | ○ | ○ | ○ |

FIG. 5

| 501 | 502 | 503 | 504 | 505 | | |
|---|---|---|---|---|---|---|
| RESTRICTION FUNCTION NAME | RESTRICTION PROCESS NAME | ENABLE/ DISABLE | TARGET FORMAT | RESTRICTION CONTENT | | |
| | | | | PRINTING DISABLED | EDITING DISABLED | PASSWORD FIXED<br>~511 ~512 ~513 |
| COPY | SEND | ENABLE | PDF | | | |
| COPY | SEND | DISABLE | TIFF.JPEG | — | — | — |
| COPY | FAX | DISABLE | — | — | — | — |

500

APPENDING RESTRICTION INFORMATION TO A JOB BEFORE TRANSMISSION

TECHNICAL FIELD

The present invention relates to an image processing apparatus, image processing method and storage medium that assigns an appropriate function restriction to data that is sent to an external device.

BACKGROUND ART

In recent years, networks that interconnect computers have been widely used. Not only computers, but also computer peripheral devices (image processing apparatuses) such as scanners, printers, facsimiles, and copiers are also connected with use of such networks. Such image processing apparatuses also include apparatuses that, in addition to a copy function, have, for example, a function for sending scanned electronic information to an external device. Such an apparatus is called an MFP (Multi Function Peripheral). With such image processing apparatuses, there is demand for a function for performing security setting (restriction setting and the like) regarding user operations, from the viewpoint of the danger of an information leak via printed matter or electronic information.

Japanese Patent Laid-Open No. 2007-058567 proposes a document distribution system in which, in a case of sending a document whose access rights are managed in the system to an external device, access rights information added in the system is set in a policy server, and such policy information and a file is sent to a user. Also, Japanese Patent Laid-Open No. 2007-095034 proposes an information processing apparatus that manages image data in the apparatus by storing the image data in a plurality of different formats in association with each other, and in a case where a restriction on operation authorization has been added to a format, the information processing apparatus adds the restriction to attribute information and management information for the other formats as well. Furthermore, the information processing apparatus disclosed in Japanese Patent Laid-Open No. 2007-095034 stores restrictions with respect to users and image data as license information, and an apparatus that is to process such image data checks the license information and operation restriction information and judges whether a set restriction will be violated. Also, in a case of sending a document to an external device, the document is sent after adding a restriction in accordance with the license information.

However, the above-described conventional technology has the following problems. In the above-described conventional technology, restriction information is set for files and functions in advance, and such settings are added likewise to a file that is sent to an external device. Therefore if, for example, a direct function restriction has not been set, there are cases where it is possible for a set function restriction to be avoided. For example, take the case of a user for whom a copy function is restricted, but a scan function and an external send function are permitted. In this case, if the user attempts to use the copy function at the image processing apparatus, the usage of the copy function is restricted. However, the user can read image data by scanning, and then send the read image data to an external device with use of an apparatus that has an external send function. Here, since it is possible for printing to be performed at the transmission destination apparatus if printing is not prohibited, there is the problem that it is possible to realize a function that is equivalent to copying, which should be restricted.

DISCLOSURE OF INVENTION

The present invention enables realization of an image processing apparatus that accurately performs function restriction on a user-by-user basis even if the case of an image processing function that is realizable with use of a plurality of apparatuses.

One aspect of the present invention provides an image processing apparatus sends image data to a designated transmission destination, comprising: an input means for inputting image data; an acquisition means for acquiring restriction information for restricting usage of an image processing function on a user-by-user basis; a determination means for determining a restriction function with respect to the image data input by the input means, based on the restriction information acquired by the acquisition means and an image processing function that is realizable by a combination of the image processing apparatus and an apparatus other than the image processing apparatus; an additional means for adding attribute information regarding the restriction function determined by the determination means to the image data input by the input means; and a send means for sending the image data to which the attribute information regarding the restriction function has been added by the additional means.

Another aspect of the present invention provides a method for performing image processing in an image processing apparatus sends image data to a designated transmission destination, the method comprising: inputting image data; acquiring restriction information for restricting usage of an image processing function on a user-by-user basis; determining a restriction function with respect to the image data input in the inputting step, based on the restriction information acquired in the acquiring step and an image processing function that is realizable by a combination of the image processing apparatus and an apparatus other than the image processing apparatus; adding attribute information regarding the restriction function determined in the determining step to the image data input in the inputting step; and sending the image data to which the attribute information regarding the restriction function has been added in the adding step.

Further features of the present invention will become apparent from the following description of exemplary embodiments (with reference to the attached drawings).

BRIEF DESCRIPTION OF DRAWINGS

FIG. 3 is a diagram showing a hardware structure of a user restriction information management apparatus 101 according to the embodiment.

FIG. 4 is a diagram showing exemplary data and an exemplary data format of function restriction information according to the embodiment.

FIG. 5 is a diagram showing exemplary data and an exemplary data format of related restriction information according to the embodiment.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Overall Structure of Image Processing System

Figure 1:
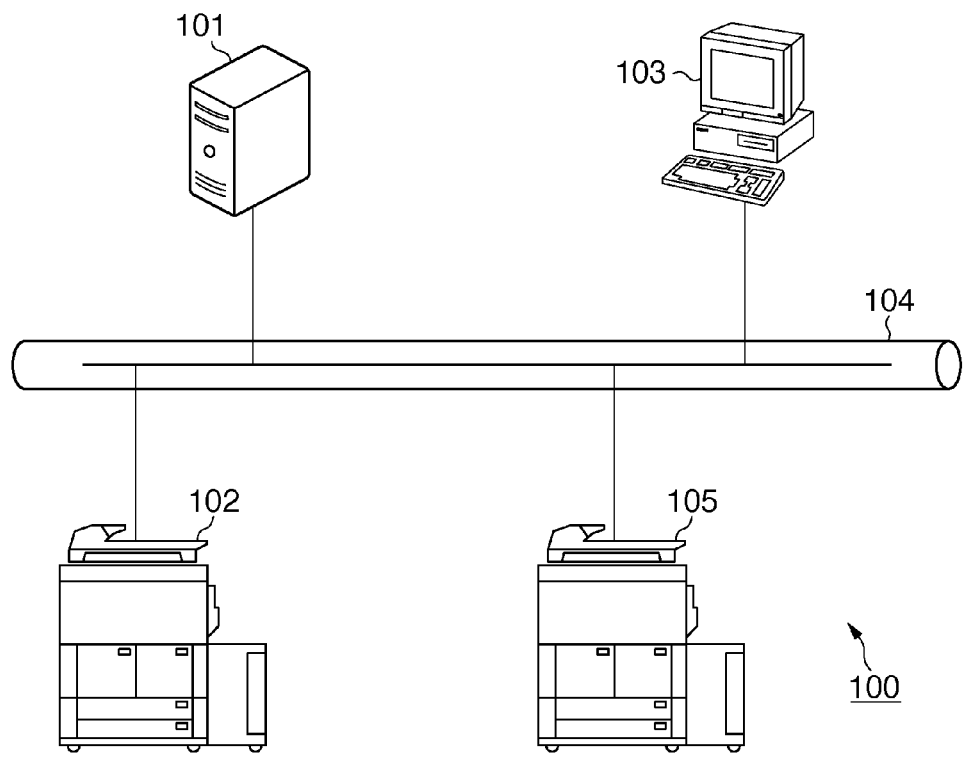
FIG. 1 is a diagram showing a structure of an image processing system 100 according to an embodiment.

Below is a description of the present embodiment with reference to FIGS. 1 to 11. First, the following describes an example of an image processing system 100 with reference to FIG. 1. FIG. 1 is a diagram showing a structure of the image processing system 100 according to the present embodiment.

The image processing system 100 includes a user restriction information management apparatus 101, image processing apparatuses 102 and 105, and a client apparatus 103. These apparatuses are connected via a local area network (a LAN, which is hereinafter called a "network") 104 so as to be able to communicate with each other.

The user restriction information management apparatus 101 manages usage restriction information for various functions included in the image processing apparatuses 102 and 105, on a user-by-user basis. Also, the user restriction information management apparatus 101 provides usage restriction information regarding a user in accordance with a request from the image processing apparatuses 102 and 105. Note that although the user restriction information management apparatus 101 may be installed on the network or equivalent functionality may be implemented in the image processing apparatuses, the following describes an example in which the user restriction information management apparatus 101 is installed on the network.

The image processing apparatuses 102 and 105 are digital multi function peripherals (MFPs) that, in addition to a function for copying a paper original, have a facsimile send function and a function (send function) for reading a paper original and sending image data thereof to an external device via the network 104. Although the image processing system 100 shown in FIG. 1 includes the two image processing apparatuses 102 and 105, this is one exemplary application. Three or more image processing apparatus may be included on the network 104. Also, the image processing apparatuses may lack a printing function, and have only a function for sending image data obtained by reading an image on an original to an external device.

The client apparatus 103 receives image data sent by the image processing apparatuses 102 and 105, and may be a PC or a server. The network 104 is a network that enables bidirectional communication between the user restriction information management apparatus 101, image processing apparatuses 102 and 105, and client apparatus 103, and the network 104 is realized in the form of an intranet or the Internet.

Image Processing Apparatus Structure

Figure 2:
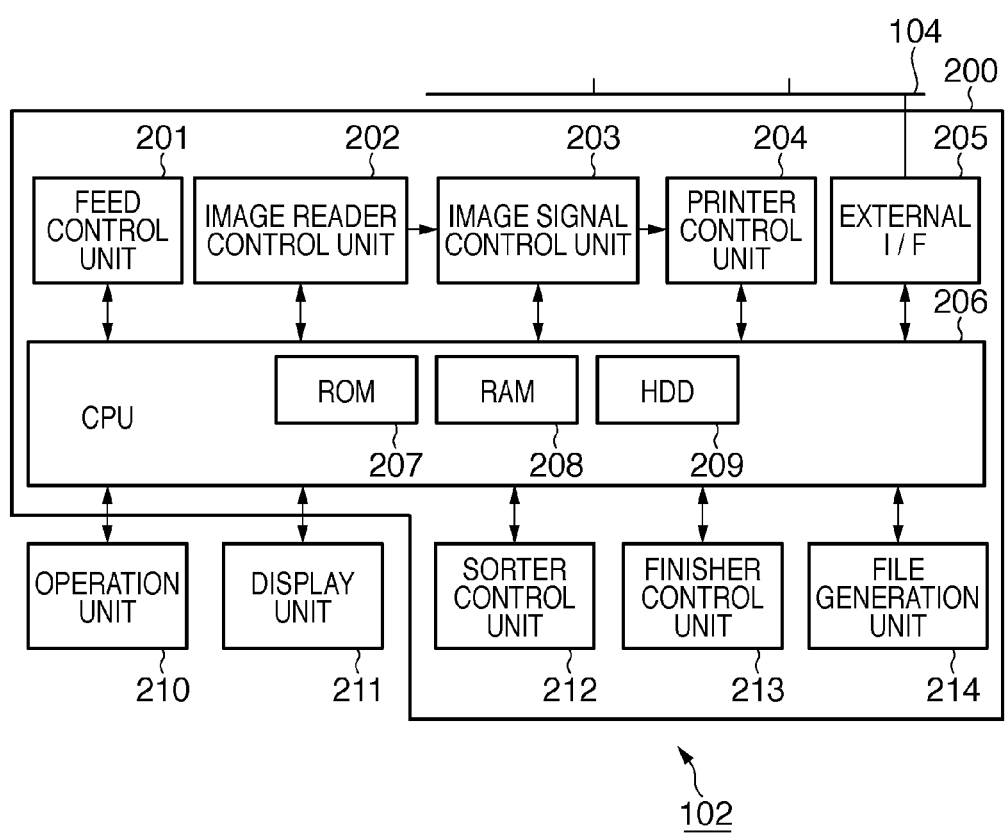
FIG. 2 is a diagram showing an exemplary functional structure of an image processing apparatus 102 according to the embodiment.

Next, the following describes a functional structure of the image processing device 102 with reference to FIG. 2. FIG. 2 is a diagram showing an exemplary functional structure of the image processing apparatus 102. Although the following describes only the image processing apparatus 102, the image processing apparatus 105 has the same functional structure. A description of the functional structure of the image processing apparatus 105 has therefore been omitted.

The image processing apparatus 102 includes a controller 200 that performs overall control of processing in the image processing apparatus 102. The controller 200 includes a feed control unit 201, an image reader control unit 202, an image signal control unit 203, a printer control unit 204, an external I/F 205, a CPU 206, a sorter control unit 212, a finisher control unit 213, and a file generation unit 214. Also, an operation unit 210 is an input apparatus of the image processing apparatus 102, and a display unit 211 is a display apparatus of the image processing apparatus 102.

The CPU 206 includes a ROM 207, a RAM 208, and an HDD 209. The CPU 206 performs overall control of the blocks (201 to 214) connected to the CPU 206, based on a control program stored in the ROM 207. The ROM 207 stores the control program executed by the CPU 206. The RAM 208 temporarily holds control data, and is used as a work area for operation processing that accompanies controlling. The HDD 209 stores information necessary to the control program and information received from the blocks.

Based on an instruction from the CPU 206, the feed control unit 201 controls the driving of an original feeding apparatus that automatically feeds originals, which are set in an original loading unit, one-by-one to an original reading position in the image processing apparatus 102. The image reader control unit 202 controls the driving of, for example, a scan unit that scans an original and an image sensor that performs photoelectric conversion to convert an optical image of an image on a scanned original to an electrical signal, and transfers an analog image signal output from the image sensor to the image signal control unit 203.

The image signal control unit 203 performs various types of processing after converting an analog image signal to a digital signal, converts the digital signal to a video signal, and outputs the video signal to the printer control unit 204 and the like. In other words, the image reader control unit 202 transfers an image signal obtained by reading an image on an original to the image signal control unit 203, thereby generating image data that expresses the image. Also, the CPU 206 receives an input of image data that has been converted to a digital signal by the image signal control unit 203, and performs various image processing functions on the input image data. Based on an input video signal (image data), the printer control unit 204 drives an exposure control unit that controls exposure onto a photoreceptor, and prints an image based on the image data onto a recording sheet.

The external I/F 205 performs various types of processing on a digital image signal that has been input via the network 104 from an external device such as a computer, converts the digital image signal to a video signal, and outputs the video signal to the printer control unit 204. Also, the external I/F 205 performs communication with the user restriction information management apparatus 101 and the client apparatus 103 via the network 104.

The operation unit 210 has a plurality of keys for setting various functions related to image processing, and outputs key signals corresponding to key operations to the CPU 206. The display unit 211 displays, for example, input content from the operation unit 210 and statuses of the control units based on signals from the CPU 206. The operation unit 210 and display unit 211 may be implemented as a touch panel LCD whose structure integrates the operation unit 210 and display unit 211.

The sorter control unit 212 controls the driving of a sorter mechanism for sorting paper on which image formation performed by the printer control unit 204 has been completed. The finisher control unit 213 controls the driving of a finisher mechanism that performs post-processing on paper on which image formation has been completed. Here, post-processing refers to, for example, punch processing for punching holes in paper and staple processing for binding paper. Also, the sorter control unit 212 and finisher control unit 213 operate based on signals from the CPU 206, in accordance with user input received via the external I/F 205 or a setting from the operation unit 210.

The file generation unit 214 generates a file in an instructed format for image information processed in the image signal control unit 203, and stores the file in the RAM 208 or HDD 209. The file generated in the file generation unit 214 is, for example, sent to the client apparatus 103 via the external I/F 205.

Also, in a case of using the facsimile function, an I/F for connecting to a telephone line (Public Switched Telephone Network) is provided in addition to the external I/F 205.

User Restriction Information Management Apparatus Structure and Client Apparatus Structure Next, the following describes a hardware structure of the user restriction information management apparatus 101 and client apparatus 103 with reference to FIG. 3. FIG. 3 is a diagram showing a hardware structure of the user restriction information management apparatus 101 according to the present embodiment. Although the following describes the hardware structure of only the user restriction information management apparatus 101, the client apparatus 103 has the same structure. A description of the hardware structure of the client apparatus 103 has therefore been omitted. The user restriction information management apparatus 101 and client apparatus 103 can be realized by a general-purpose personal computer.

The user restriction information management apparatus 101 includes a CPU 301, a RAM 302, a ROM 303, an NIC 304, a VRAM 305, a KBC 307, an HDD 310, and an IOC 311. The user restriction information management apparatus 101 also includes a system bus 300 that connects the above units and transfers various types of data, control information, and the like.

The CPU 301 is a central processing unit that performs various types of control with respect to the user restriction information management apparatus 101 and performs operations. The RAM 302 is a random access memory and, as the main memory of the CPU 301, provides a storage area for an execution program, an execution area for the execution program, and a storage area for data. The ROM 303 is a read-only memory that stores operation processing procedures performed by the CPU 301. The ROM 303 stores, for example, a basic program (generally called a BIOS) for controlling the units of the user restriction information management apparatus 101, and information required to cause the system to operate.

The NIC 304 is a controller for controlling input/output signals sent to and received from an external network. The NIC 304 is a communication controller used for connecting to an external network 314. The VRAM 305 is a video RAM. The VRAM 305 expands image data to be displayed on a CRT 306, and performs display control.

The CRT 306 is a display apparatus that is connected to the VRAM 305 and displays various types of information from the user restriction information management apparatus 101. The CRT 306 is included in the user restriction information management apparatus or may be used in a housing that is separate from the user restriction information management apparatus 101. A liquid crystal display apparatus, touch panel liquid crystal display apparatus or the like can also be used as the display apparatus.

The KBC 307 is a controller that receives and controls input signals from input apparatuses such as a KB (keyboard) 308 and a mouse 309 that are connected to the user restriction information management apparatus 101. The KB 308 and mouse 309 are input apparatuses that receive input information from a user. An input unit of the aforementioned touch panel liquid crystal display apparatus can also be used instead of the above input apparatuses.

The HDD 310 is a hard disk drive. The HDD 310 is used for storing, for example, document data, various types of management data, and application programs used in the user restriction information management apparatus 101. The IOC 311 is a controller for controlling input signals and output signals exchanged between the user restriction information management apparatus 101 and, for example, a scanner 313 that is an information input apparatus and a PRT (printer) 312 that is an output apparatus. The user restriction information management apparatus 101 can be connected to external input/output apparatuses other than the scanner 313 and PRT 312, and information devices such as an external HDD and an MO drive. The PRT 312 is a printer for printing electronic image data held in the user restriction information management apparatus 101. The scanner 313 is a reading apparatus for reading an image on a paper original as electronic image data. The printer 312 and scanner 313 are connected by a USB interface or the like, and can be removed.

Function Restriction Information and Related Restriction Information

The following describes data formats of function restriction information and related restriction information used by the user restriction information management apparatus 101, with reference to FIG. 4 and FIG. 5. FIG. 4 is a diagram showing exemplary data and an exemplary data format of function restriction information according to the present embodiment. Here, the function restriction information refers to information in which usage restrictions on image processing functions that a user causes to be executed with use of the image processing apparatuses 102 and 105 and the like are set on a user-by-user basis. Also, according to the present embodiment, the function restriction information is held in the user restriction information management apparatus 101.

The items included in a function restriction information list 400 that holds the function restriction information are username 401, copy 402, scan 403, send 404, and fax 405. Username 401 is user information that indicates users and is managed by the user restriction information management apparatus 101. Copy 402, scan 403, send 404, and fax 405 are image processing functions that can be realized with use of the image processing apparatus 102, and indicate function restriction information that, for each user indicated under username 401, specifies whether the corresponding function is to be provided. Here, "copy" is a function for, with use of a printing apparatus such as the printer control unit 204 or printer 312, printing image data that has been obtained by a reading apparatus such as the image reader control unit 202 or scanner 313 by reading an image on an original. Also, "scan" is a function for storing, in an internal storage apparatus, image data obtained by a reading apparatus such as the image reader control unit 202 or scanner 313 reading an image on an original, and a function for causing the execution of a reading operation by a scanner driver. Also, "send" is a function for converting input image data into an image file and sending the image file to an apparatus on a network. Transmission protocols that can be used by the send function include email, FTP, SMB, WebDAV, Internet fax, and the like. Also, "fax" is a function for sending input image data by facsimile via a telephone line.

In the function restriction information list 400 shown in FIG. 4, "O" represents the permission of a function and "X" represents the prohibition of a function. For example, FIG. 4 shows that a user A indicated in a record 411 can use the functions "copy", "scan", "send", and "fax", that is to say, all of the functions. However, FIG. 4 shows that a user D indicated in a record 412 can only use the functions "scan", "send" and "fax", and cannot use the function "copy".

FIG. 5 is a diagram showing exemplary data and an exemplary data format of related restriction information according to the present embodiment. Related restriction information refers to information for performing function restriction in cooperation with the aforementioned function restriction information. Specifically, there are cases where a restriction function, which is a function that is restricted by the function restriction information, can be realized by combining other functions that are different from the restriction function, and related restriction information refers to information for restricting the usage of such other functions. For example, the related restriction information is information for restricting an image processing function that can be realized by combining an image processing function executed by the image processing apparatus 102 and an image processing function executed by another apparatus. Also, although the related restriction information is described in the present embodiment based on the assumption of being held in the image processing apparatuses 102 and 105, the related restriction information may be included in the user restriction information management apparatus 101.

Information in a related restriction information list 500 includes a restriction function name 501, restriction process name 502, enable/disable 503, target format 504, and restriction content 505. The restriction function name 501 and restriction process name 502 are items that indicate any function restricted in the function restriction information list 400 that is managed by the user restriction information management apparatus 101. Specifically, the restriction function name 501 indicates the function names of restriction functions set in the function restriction information list 400. Also, the restriction process name 502 indicates the function names of function that are targets of restriction in the related restriction information list 500.

Enable/disable 503 is an item that indicates whether the usage of functions indicated by restriction process name 502 is permitted. Target format 504 is an item that indicates data formats targeted by enable/disable 503. Here, if no data format is designated in target format 504 (shown as "-" in FIG. 5), all data formats are considered to be included. Restriction content 505 is an item that indicates restriction content if the usage of a function is permitted in enable/disable 503.

For example, a record 511 shows that in a case of the "send" function being used by a user for whom the function "copy" is disabled in the function restriction information list 400, it is possible to send a "PDF" to which the restrictions "printing disabled", "editing disabled" and "password fixed" have been added. Also, a record 512 shows that in a case of the "send" function being used by a user for whom the function "copy" is disabled in the function restriction information list 400, data in the formats "TIFF" and "JPEG" cannot be sent. Also, a record 513 shows that a user for whom the function "copy" is disabled in the function restriction information list 400 cannot use the function "fax" in any case.

Even in the case of a job that is performed with use of a plurality of apparatuses, the image processing system 100 according to the present embodiment accurately determines function restrictions with use of the above-described function restriction information list 400 and related restriction information list 500. The following describes function restriction control in the image processing system 100 using the function restriction information list 400 and related restriction information list 500.

Overall Sequence

Figure 6:
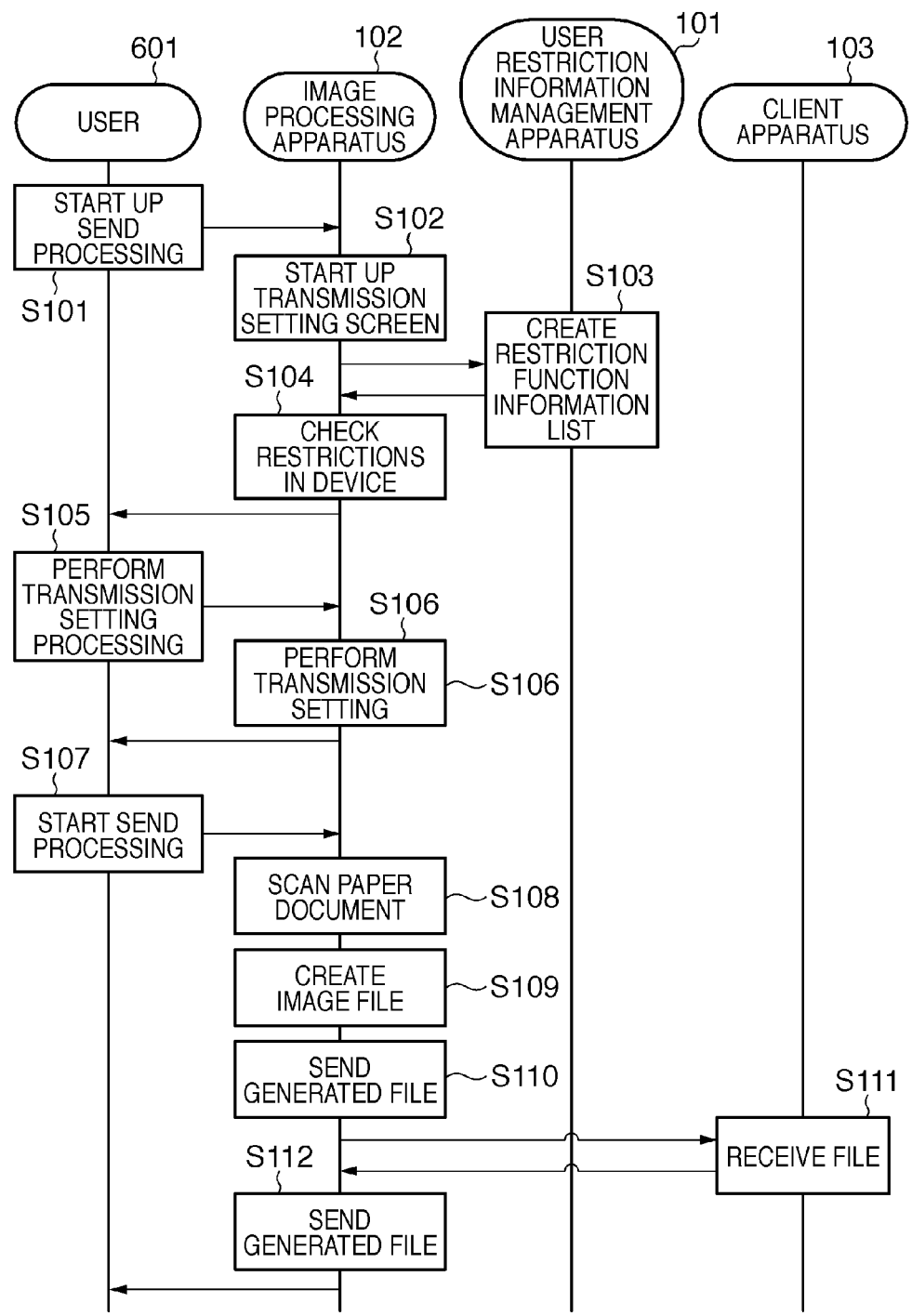
FIG. 6 is a sequence diagram showing an overall processing procedure of the image processing system 100 according to the embodiment.

FIG. 6 is a sequence diagram showing an overall processing procedure of the image processing system 100 according to the present embodiment. The sequence described below is based on the assumption of a case in which a user 601 causes the image processing system 100 to perform processing for causing the image processing apparatus 102 to read an image of an original and send the read data to the client apparatus 103. In this description, the user 601 is considered to have been user-authenticated with respect to the user restriction information management apparatus 101 via the image processing apparatus 102 before the present processing sequence is used, and the image processing apparatus 102 is considered to be in a usable condition. Accordingly, the user who is operating the image processing apparatus 102 has been specified.

In step S101, the image processing apparatus 102 receives a send processing startup instruction from the user 601 via the operation unit 210 that is an input apparatus. Thereafter, in step S102 the image processing apparatus 102 starts up a transmission setting screen. Specifically, the image processing apparatus 102 functions as a display control means, performs processing for, for example, reading resources from setting screens and constituting screen information, and causes the display unit 211 to display the transmission setting screen. Furthermore, the image processing apparatus 102 requests the user restriction information management apparatus 101 to send the function restriction information list 400 in the image processing apparatus 102 corresponding to the user 601 who started up the processing.

In step S103, the user restriction information management apparatus 101 searches for the function restriction information list 400 corresponding to the designated user, and sends the found function restriction information 400 to the image processing apparatus 102. Specifically, the user restriction information management apparatus 101 sets "username" shown in FIG. 4 as the search keyword, and searches for the corresponding function restriction information list 400. Furthermore, the user restriction information management apparatus 101 sends the found function restriction information list 400 to the image processing apparatus 102.

In step S104, with use of the function restriction information list 400 acquired from the user restriction information management apparatus 101 in S103 and related restriction information list 500 held in the image processing apparatus 102, the image processing apparatus 102 causes such restriction information to be reflected in the setting screen. The processing of S104 is described in detail later with use of FIG. 10. Also, after the processing up to and including S104 has been completed, the image processing apparatus 102 functions as a display control means, causes the display unit 211 to display a transmission setting screen 701 shown in later-described FIG. 7, and provides the user 601 with an operable condition.

Next, in step S105, the image processing apparatus 102 acquires send processing setting information based on an instruction performed by the user 601 via the displayed transmission setting screen 701. In step S106, the image processing apparatus 102 causes setting information input by the user 601 with use of the operation unit 210 of the image processing apparatus 102 to be reflected in the transmission setting screen 701 being displayed by the display unit 211. The user 601 repeats S105 until desired settings are achieved. When the transmission setting performed by the user 601 has ended, in step S107 the image processing apparatus 102 acquires a notification indicating a start of the send processing that has been input by the user.

When the send start notification has been acquired, in step S108 the image processing apparatus 102 reads an image on an original that has been set by the feed control unit 201 and image reader control unit 202. Image data expressing the read image is stored in the RAM 208 or HDD 209. Then, in step S109 the image processing apparatus 102 generates an image file from the image data obtained by reading the image in S108, in accordance with setting content reflected in the transmission setting screen. In other words, the image processing apparatus 102 causes the image file to reflect restriction functions based on the restriction information for restricting the usage of an image processing function by the user that has been acquired from the user restriction information management apparatus 101 as well as image processing functions that are realizable by a combination of the image processing apparatus 102 and another apparatus. Although described in detail later, the image processing apparatus 102 generates an image file to which attribute information for prohibiting the usage of restriction functions has been added. The generated file is stored in the RAM 208 or HDD 209.

Next, in step S110, the image processing apparatus 102 sends the file stored in the RAM 208 or HDD 209 to a destination reflected in the transmission setting screen via the network by an instructed protocol. Thereafter, in step S111, the client apparatus 103 that is the destination receives the file sent by the instructed protocol. The client apparatus 103 receives the file with use of an application corresponding to the transmission protocol. For example, if the image processing apparatus 102 sent the file by mail, the client apparatus 103 receives an email to which the file is attached by mail software. Upon receiving the file, the client apparatus 103 sends a notification confirming the reception to the image processing apparatus 102. When the send processing has ended, in step S112 the image processing apparatus 102 deletes the image data stored in the RAM 208 or HDD 209, and ends the job. Also, in the client apparatus 103, the received file is opened by an application corresponding to the received file. For example, if the sent file is a PDF, the file is opened by a PDF file application. The application can recognize the attribute information added to the received file and cause corresponding restrictions to be reflected. In other words, if a print prohibition attribute has been added to the received file, control is performed so that the file cannot be printed.

Transmission Setting Screen Structure

Figure 7:
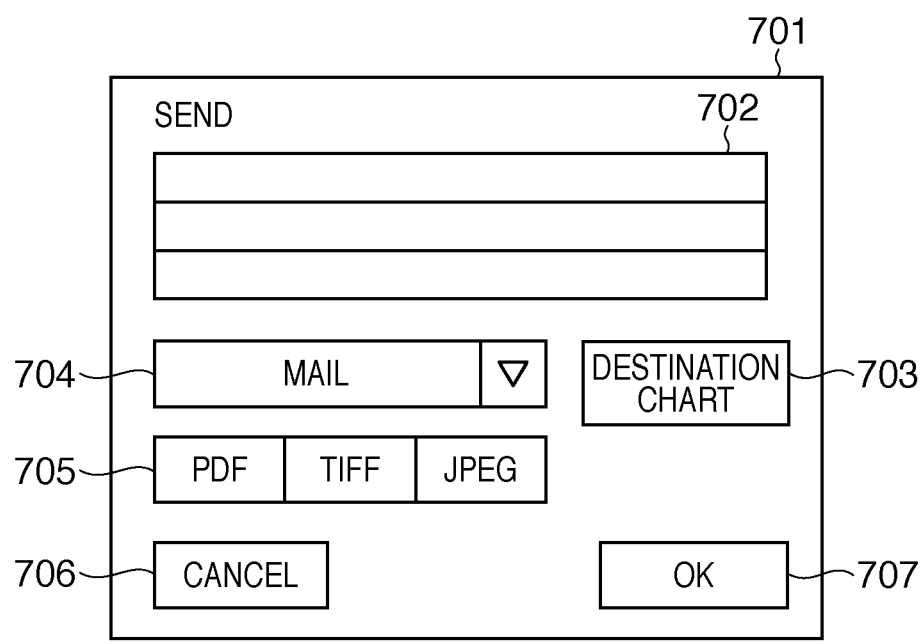
FIG. 7 is a diagram showing a transmission setting screen 701 according to the embodiment.
Figure 8:
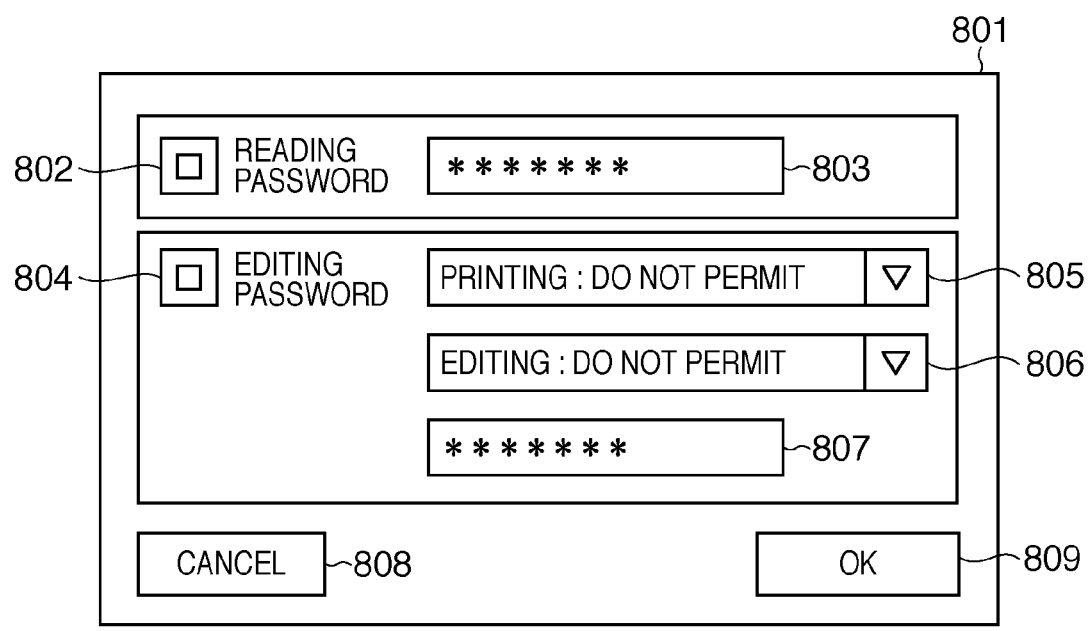
FIG. 8 is a diagram showing a transmission file advanced setting screen 801 according to the embodiment.
Figure 9:
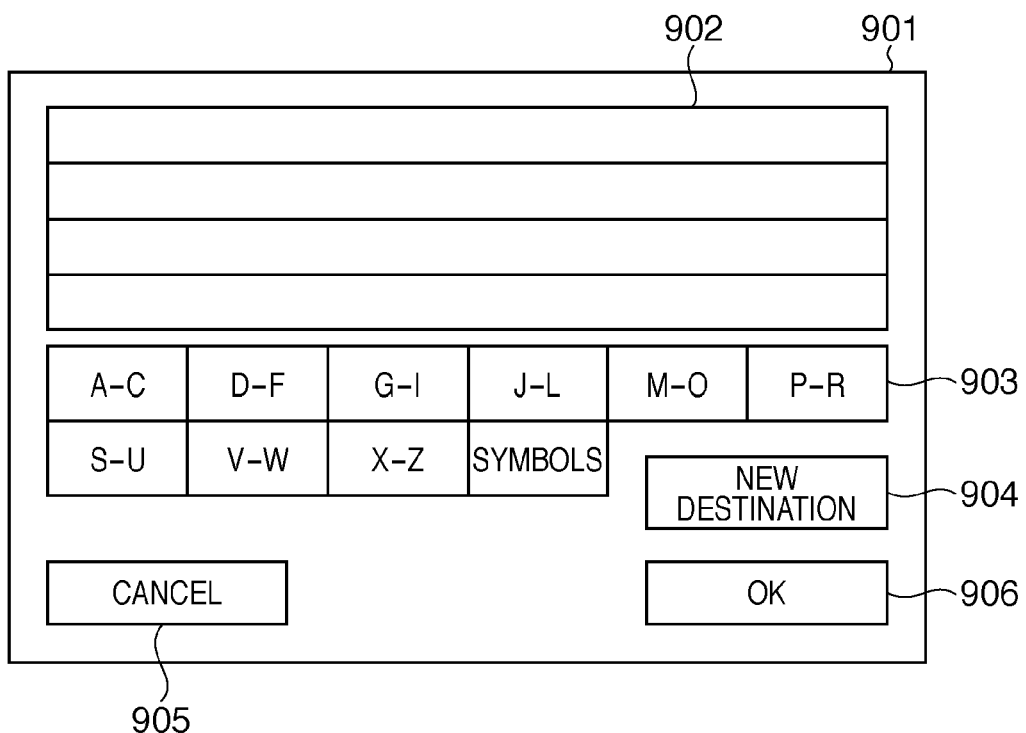
FIG. 9 is a diagram showing a destination setting screen 901 according to the embodiment.

The following describes setting content set by the user 601 in S105 and S106 shown in FIG. 6 and a setting screen indicating the setting content, with reference to FIGS. 7 to 9. FIG. 7 is a diagram showing the transmission setting screen 701 according to the present embodiment. FIG. 8 is a diagram showing a transmission file advanced setting screen 801 according to the present embodiment. FIG. 9 is a diagram showing a destination setting screen 901 according to the present embodiment.

The transmission setting screen 701 includes a destination information display field 702, an address chart button 703, a transmission protocol selection field 704, a transmission file format selection field 705, a send processing cancel button 706, and a send processing start button 707. A file transmission destination corresponding to the transmission format selected in the transmission protocol selection field 704 is displayed in the destination information display field 702. For example, a destination mail address is displayed if mail transmission has been selected, and destination server information is displayed if FTP has been selected.

Also, the address chart button 703 is used to set a destination in the destination information display field 702. When the address chart button 703 is pressed, the destination setting screen 901 shown in FIG. 9 is displayed, a destination registered in the address chart can be selected, and a new destination can be input. Destination information designated in the destination setting screen 901 is reflected in the destination information display field 702 after confirmation.

The transmission protocol selection field 704 is a field for selecting a communication protocol in a case of sending a file by the send processing. Transmission protocols such as "mail", "FTP" and "WebDAV" are displayed in the transmission protocol selection field 704, and an arbitrary format can be selected from among the displayed transmission protocols. Note that if "copy" (copy prohibition) is determined to be included in the restriction functions in step S104, the designation of Internet fax as the transmission protocol is prohibited here. This is because in Internet faxing, a TIFF file is transmitted as an email file attachment, and attribute information for prohibiting the usage of restriction functions cannot be added to a TIFF file.

The transmission file format selection field 705 is a field for selecting the format of an image file to be sent by the designated protocol. As shown in FIG. 7, file formats that can be generated by the image processing apparatus 102, such as "PDF", "TIFF" and "JPEG", are displayed in the transmission file format selection field 705 in a selectable condition. The selectable formats in the transmission file format selection field 705 can be restricted by target format 504 in the above-described related restriction information list 500. In other words, only file formats to which attribute information for prohibiting the usage of restriction functions can be added are in a selectable condition, and the selection of formats to which attribute information cannot be added is prohibited. For example, only selectable formats are displayed as pressable buttons. If a selectable button is selected, the transmission file advanced setting screen 801 shown in FIG. 8 is displayed in accordance with the selected file format, and advanced file setting can be performed.

The send processing cancel button 706 is selected in a case of cancelling the send processing that was started up by the user 601 in S101 shown in FIG. 6, before the send processing is performed. When the send processing cancel button 706 has been selected, the image processing apparatus 102 clears the content set by the user up to that time.

The send processing start button 707 is selected when setting of the send processing by the user has ended. When the send processing start button 707 has been pressed, the processing from S108 to S112 shown in FIG. 6 is performed.

The following describes the transmission file advanced setting screen 801 shown in FIG. 8. The transmission file advanced setting screen 801 is a screen that is displayed if "PDF" has been selected in the transmission file format selection field 705. Although the screen structure content is also limited to only settings necessary for the present embodiment, it is also possible to perform setting for other functions that can be set for PDF files. Also, if another file format (e.g., "TIFF" or "JPEG") has been selected, a screen including different settable content is displayed.

The transmission file advanced setting screen 801 includes a reading password setting instruction button 802, a reading password input field 803, an editing password setting instruction button 804, and a printing designation selection field 805. Furthermore, the transmission file advanced setting screen 801 includes an editing designation selection field 806, an editing password input field 807, a setting cancel button 808, and a setting confirmation button 809.

The reading password setting instruction button 802 is a button for selecting whether to assign a password restriction to reading. When the reading password setting instruction button 802 has been pressed, the input of a password is necessary in a case of reading (opening) a transmission file. Input to the reading password input field 803 is possible only if password restriction has been enabled by the above-described reading password setting instruction button 802. A password can be input by an input unit on a separately provided screen (e.g., a software keyboard).

The editing password setting instruction button 804 is a button for selecting whether to assign a password restriction to editing. When the editing password setting instruction button 804 has been pressed, the input of a password is necessary in a case of editing a transmission file. The printing designation selection field 805 is selectable only if password restriction has been enabled by the above-described editing password setting instruction button 804, and an arbitrary setting can be selected from between the selection items "permit" and "do not permit" regarding file print processing. Here, if "do not permit" has been selected, printing of the file at the transmission destination is restricted.

The editing designation selection field 806 is selectable only if password restriction has been enabled by the above-described editing password setting instruction button 804. Specifically, an arbitrary setting can be selected from among selection items such as "permit page insertion, deletion and rotation", "permit everything other than page extraction" and "do not permit".

Input to the editing password input field 807 is possible only if password restriction has been enabled by the above-described editing password setting instruction button 804. Similarly to the above-described reading password input field 803, a password can be input by an input unit on a separately provided screen.

The setting cancel button 808 is used to cancel the file setting processing and to disable the selection of the above-described transmission file format selection field 705. When the setting cancel button 808 has been pressed, the above-described processing is performed and thereafter the transmission file advanced setting screen 801 is closed. On the other hand, the setting confirmation button 809 is used for confirming the file setting processing. When the setting confirmation button 809 has been pressed, the above-described processing is performed and thereafter the transmission file advanced setting screen 801 is closed.

The following describes the destination setting screen 901 shown in FIG. 9. The destination setting screen 901 includes a selected destination list display field 902, selection buttons 903 for selecting from an existing address chart, a new destination input button 904, a destination setting cancel button 905, and a destination setting confirmation button 906.

The destination list display field 902 is a field in which destination information that has been input or selected on the destination setting screen 901 is displayed. A plurality of destinations can be designated in the destination list display field 902. The selection buttons 903 for selecting from an existing address chart is constituted from a plurality of buttons according to a range of initial characters of destination information that has been registered in advance. When a button constituting the selection buttons 903 for selecting from an existing address chart has been selected, a list of destinations whose initial character corresponds to the selected button is displayed, and a desired destination can be selected from the displayed list. The selected destination is added to the display in the destination list display field 902.

The new destination input button 904 is a button that is pressed if a desired destination is not included in the address chart. When the new destination input button 904 has been pressed, an input unit on a separately provided screen is displayed, and a destination can be input. When the content of an input character string has been confirmed by the input unit, the content is added as a destination to the display in the destination list display field 902.

The destination setting cancel button 905 is used to discard setting content in the destination list display field 902. When the destination setting cancel button 905 has been pressed, the destination setting screen 901 is closed without existing destination information being updated. On the other hand, the destination setting confirmation button 906 is used to confirm setting content in the destination list display field 902. When the destination setting confirmation button 906 has been pressed, the above-described processing is performed and thereafter the destination setting screen 901 is closed.

Input to and selection in the above-described structures of the screens shown in FIGS. 7 to 9 can be forcibly restricted by the image processing device 102, and in such a case, the user can only perform input/setting based on the restriction. Also, the constituent elements of the above-described screens are not limited to the format shown in the figures. The constituent elements can be realized in other formats, such as input units and representation methods.

Transmission Setting Screen Display Processing Flow

Figure 10:
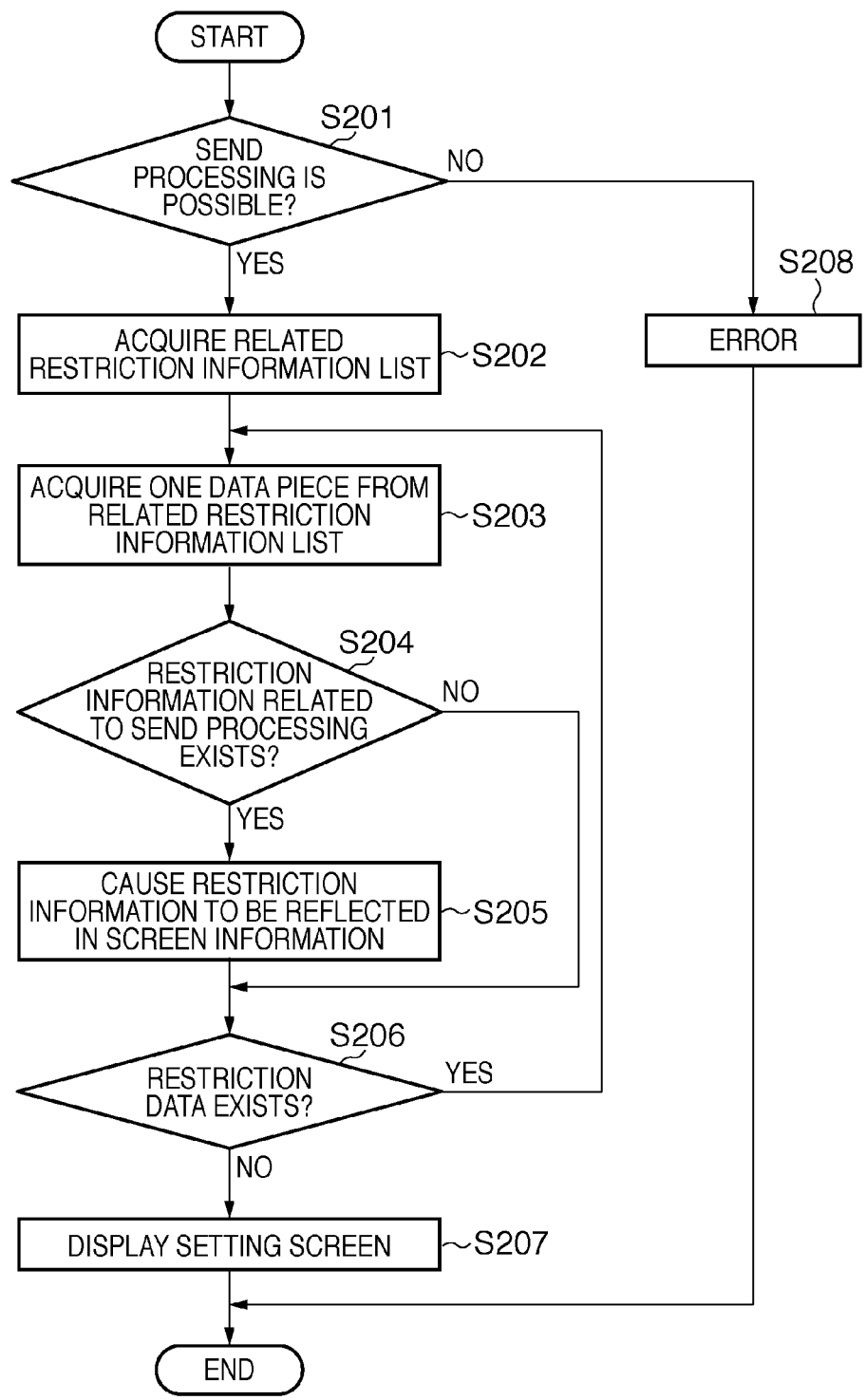
FIG. 10 is a flowchart showing a restriction function setting procedure according to the embodiment.

The following describes a method for displaying restriction information to the user with reference to FIG. 10. FIG. 10 is a flowchart showing a restriction function setting procedure according to the present embodiment. The processing described below is the details of processing performed in S104 shown in FIG. 6. Also, in the following description, the image processing apparatus 102 is considered to have acquired, in advance, user information on which authentication processing has been performed and function restriction information pertaining to the user acquired from the user restriction information management apparatus 101. Furthermore, in the following description, information pertaining to "user D" is used as the user information, and information in the record 412 (user D) in the function restriction information list 400 is used as the function restriction information. Note that overall control of the following processing is performed by the CPU 206 of the image processing apparatus 102.

First, in step S201 the CPU 206 determines whether usage of send processing is possible in the send 404 field corresponding to "user D". If information in the send 404 field indicates that send processing is prohibited, the CPU 206 moves the processing to S208. In step S208, the CPU 206 performs error processing since the usage of send processing is not authorized in any case, and thereafter ends the processing. Specifically, the CPU 206 alerts the user that usage of the send function is prohibited by, for example, causing the display unit 211 to perform a display, and thereafter ends the processing. However, if usage of send processing is permitted, the CPU 206 moves the processing to S202.

In step S202, the CPU 206 acquires the related restriction information list 500 held in the information processing apparatus 102. Here, the CPU 206 acquires, from a memory in the apparatus, only information that is necessary based on the function restriction information corresponding to "user D". Specifically, since usage of the "copy" function is disabled in the function restriction information of the record 412, the CPU 206 sets information indicating "copy" as a search keyword, and acquires, from the related restriction information list 500, information in records in which "copy" is indicated in restriction function name 501. Accordingly, three records in the related restriction information list 500 shown in FIG. 5, namely records 511, 512 and 513, are targets of acquisition. When the acquisition processing has ended, the CPU 206 repeats the processing of the below-described S203 to S206 a number of times equal to the number of acquired records.

In step S203, the CPU 206 selects one data piece from the data acquired in S202. When a data piece has been selected, in the step S204 the CPU 206 judges whether the selected data piece is restriction information related to send processing. Specifically, the CPU 206 judges whether information indicating "send" is stored in the restriction process name 502. If restriction process name 502 indicates send processing (records 511 and 512 in the related restriction information list 500), the CPU 206 moves the processing to S205. However, if restriction process name 502 does not indicate send processing (record 513 in the related restriction information list 500), the CPU 206 moves the processing to S206.

In step S205, since a restriction has been set on send processing, the CPU 206 causes a restricted condition of input fields and setting fields to be reflected in the setting screens. Specifically, in the record 511, information has been set so that for the "PDF" format, only a file that has been restricted according to "printing disabled", "editing disabled", and "password fixed" (a file to which attribute information indicating such content has been added) can be sent. Accordingly, the CPU 206 constitutes the display of the transmission file advanced setting screen 801 as described below. First, the editing password setting instruction button 804 is displayed in a selectable condition. "do not permit" is displayed in the printing designation selection field 805. "do not permit" is displayed in the editing designation selection field 806. The editing password input field 807 is displayed in a condition such that input from the user is not received.

Also, in the record 512, information has been set so that sending in the "TIFF" and "JPEG" formats is prohibited. Accordingly, the CPU 206 constitutes the display of the transmission setting screen 701 as described below. First, the "TIFF" and "JPEG" buttons are displayed in a disabled state in the transmission file format selection field 705. In this way, after the restriction of target records has been reflected, the CPU 206 moves the processing to S206.

In step S206, the CPU 206 judges whether any unprocessed records remain among the records acquired in S202. Here, the CPU 206 moves the processing to S203 upon judging that an unprocessed record remains, and moves the processing to S207 upon judging that all of the records have been processed.

In step S207, the CPU 206 displays a setting screen that reflects all of the restriction information on the display unit 211 of the image processing apparatus 102. This realizes the application of a restriction in cooperation between functions, with respect to a function restriction on "user D".

Send Execution Processing Flow

Figure 11:
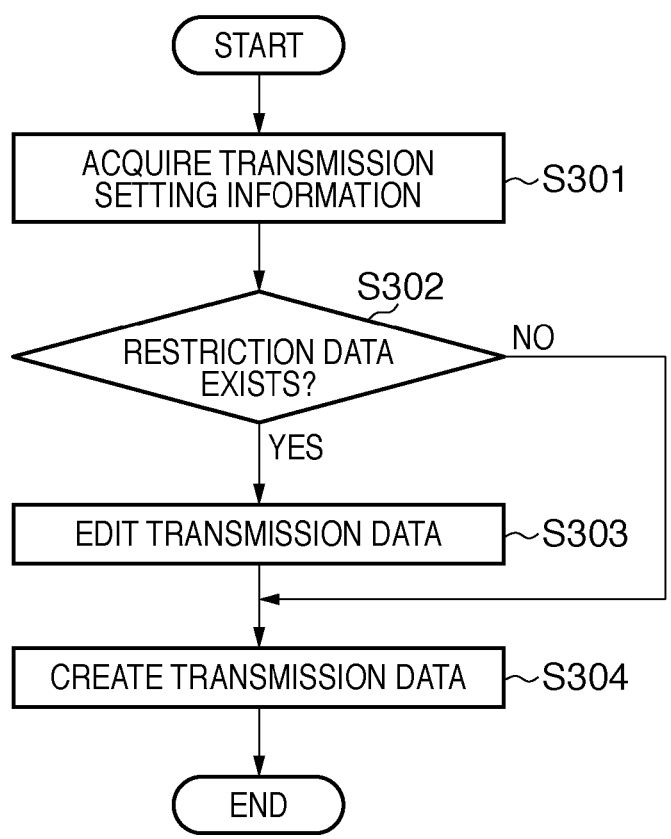
FIG. 11 is a flowchart showing a send processing procedure in accordance with function restrictions according to the embodiment.

The following describes file send control in send processing that has been instructed by the user, with reference to FIG. 11. FIG. 11 is a flowchart showing a send processing procedure in accordance with function restrictions according to the present embodiment. Note that the processing described below is the details of the file setting processing performed in S109 shown in FIG. 6. Overall control of the processing described below is performed by the CPU 206 of the image processing apparatus 102. Furthermore, in the following description, user information that has been authenticated, function restriction information pertaining to the user acquired from the user restriction information management apparatus 101, and related restriction information held in the image processing apparatus 102 are considered to have been acquired. Also, similarly to FIG. 10, in the following description, information pertaining to "user D" is used as the user information, and information in the record 412 (user D) in the function restriction information list 400 is used as the function restriction information.

First, in step S301 the CPU 206 acquires setting content for send processing that the user set on the screen in S106 shown in FIG. 6. For example, here, the following content is assumed to have been set as the settings for "user D".

Destination information display field 702
user D's mail address (arbitrary input)
Transmission protocol selection field 704
mail (arbitrary input)
Transmission file format selection field 705
"PDF" (system fixed)
Reading password setting instruction button 802
not designated (arbitrary input)
Reading password input field 803
not set (linked to 802)
Editing password setting instruction button 804
designated (system fixed)
Printing designation selection field 805
"do not permit" (system fixed)
Editing designation selection field 806
"do not permit" (system fixed)
Editing password input field 807
not designated (system fixed)

In the above setting content, items indicated by "system fixed" in parentheses are items that cannot be input or selected by the user D, that is to say, the CPU 206 has caused these items to reflect restriction content in the processing described using FIG. 10. On the other hand, items indicated by "arbitrary input" are items that have been input or selected by the user D.

Next, in step S302, the CPU 206 judges whether a final check is necessary, based on whether related restriction information that has been acquired in advance exists. Here, the CPU 206 moves the processing to S303 if related restriction information exists, and moves the processing to S304 if related restriction information does not exist.

In step S303, the CPU 206 compares the acquired content from the above-described screen and the related restriction information, and edits transmission data according to the related restriction information. For example, the CPU 206 performs the following checks and forced setting according to the records 511 and 512.

Specifically, the CPU 206 checks whether "TIFF" or "JPEG" is selected. Also, the CPU 206 checks the setting status if "PDF" is selected. Here, the setting status indicates statuses such as "Printing: do not permit", "Editing: do not permit", and whether an editing password has been designated. In this example, an editing password has not been designated, and therefore an arbitrary password is generated and set in the editing password input field 807. The generation of this password is related to the "password fixed" portion that is set in restriction content 505 in the related restriction information list 500. Specifically, the CPU 206 generates a password for internally modifying the restriction content on the image processing apparatus 102 side, so that the print/edit settings (restriction content) are not modified after sending to an external device. Furthermore, the CPU 206 does not disclose the generated password to external devices. Accordingly, the image processing apparatus 102 prevents modification of the restriction content. The password may be created from arbitrary information in the image processing apparatus 102, or may be dynamically created with use of the processing year/month/day or the like. Here, "123456789" is set as the editing password.

The following shows exemplary settings for "user D" at the stage at which the processing of S303 has ended.

Destination information display field 702 that indicates the transmission destination
    user D's mail address (arbitrary input)
    Transmission protocol selection field 704
    mail (arbitrary input)
    Transmission file format selection field 705
    "PDF" (system fixed)
    Reading password setting instruction button 802
    not designated (arbitrary input)
    Reading password input field 803
    not set (linked to 802)
    Editing password setting instruction button 804
    designated (system fixed)
    Printing designation selection field 805
    "do not permit" (system fixed)
    Editing designation selection field 806
    "do not permit" (system fixed)
    Editing password input field 807
    "123456789" (system fixed)

In this way, when editing has ended, the CPU 206 moves the processing to S304.

Next, in step S304 the CPU 206 creates an image file based on image data that is stored in the RAM 208 or HDD 209 and that expresses an image on an original that has been read in S108 shown in FIG. 6, and the setting content that has been set up to and including the above-described S303. The file creation processing is performed by the file generation unit 214. Also, the generated file is temporarily stored in the RAM 208 or HDD 209. Note that the generated image file is sent after again being converted according to the designated transmission protocol. Specifically, if mail has been designated, processing such as Base64 conversion, MIME encoding, and the assignment of a mail header are performed based on the generated image file. Then, as described above, in a case of sending image data that has been obtained as a result of the reading apparatus reading an image on an original, if a copy prohibition has been set for the user who instructed such sending, an attribute that prohibits printing of the image data is added before the image data is sent. Accordingly, even if the client apparatus that receives the image data attempts to cause a print apparatus (e.g., the printer 312) to print the image data, such printing cannot be performed, and therefore copying can be prohibited even in the case of causing a plurality of apparatuses to work in cooperation.

In this way, according to the present embodiment, the user restriction information management apparatus 101 holds the function restriction information, and the image processing apparatus 102 holds the related restriction information. However, a structure in which the related restriction information is held in the user restriction information management apparatus 101 is also possible. In this case, the image processing apparatus 102 acquires information from the user restriction information management apparatus 101 at the same time as acquiring the related restriction information. Also, although the network 104 is a single network, connecting to a client apparatus, which is the file transmission destination, on a local network called a LAN via the Internet is also possible.

As described above, the image processing system according to the present embodiment includes a user restriction information management apparatus that has function restriction information and an image processing apparatus that has related restriction information. Also, the image processing apparatus performs a user-designated function based on restriction content in the function restriction information and related restriction information. Here, there are cases where a restriction function, which is a function that is restricted by the function restriction information, can be realized by combining a plurality of other functions that are different from the restriction function, and related restriction information refers to information for restricting the usage of such other functions. Accordingly, even if functions that are restricted on a user-by-user basis can be realized by combining a plurality of other functions, the present image processing system can appropriately restrict such functions. Accordingly, the present image processing apparatus can accurately realize function restriction even in the case of a job that is performed via a plurality of apparatuses in the image processing system. For example, if a copy prohibition has been set for a predetermined user, the present image processing system can restrict the copying of data with use of a scan function and a fax function.

Note that the present invention is not limited to the above-described embodiment. Various modifications are also possible. For example, when a user instructs a function to be performed, the present image processing system may cause a display apparatus to display a setting screen that reflects the function restriction information and related restriction information, allow the user to perform setting in a condition in which advanced settings of the function have been restricted, and thereafter perform the function. Accordingly, the present image processing system not only permits or prohibits the function instructed by the user, but also can restrict details of the function by, for example, performing the function in a restricted condition, thereby providing higher-quality security.

Also, if a user for whom the copy function is prohibited instructs the send function to be performed, the present image processing system may assign restriction content to data targeted for processing, as well as generate a password for modifying the restriction content. In this case, the image processing apparatus sends only the data targeted for processing without notifying the transmission destination of the password. Accordingly, the present image processing system prevents the modification of the restriction content at the transmission destination, and enables providing a security system that has a higher degree of security.

Also, although functions that can be realized by combining image processing functions that are executable by a plurality of apparatuses are described as being held in the form of related restriction information in the above description, the present invention is not limited to this. In other words, which attribute information should be added may be determined by judging whether a function can be realized by a combination of apparatuses based on only user restriction information. Also, attribute information for restricting a function that can ultimately be realized by a combination of apparatuses may be added without performing such a judgment.

Other Embodiments

As described above, the object of the present invention can also be achieved by supplying a system or apparatus with a storage medium having recorded thereon program code of software for realizing the functionality of the above-described embodiment, and by a computer (a CPU, MPU or the like) of the system or apparatus reading and executing the stored program code.

In this case, the actual program code read from the storage medium realizes the new functionality of the present invention, and the storage medium that stores the program code constitutes the present invention.

Accordingly, any mode of program, such as object code, a program executed by an interpreter, or script data supplied to an OS (operating system), is acceptable, as long as the functionality of the program is provided.

Examples of a storage medium for supplying the program include a flexible disk, a hard disk, an optical disk, a magneto-optical disk, an MO, a CD-ROM, a CD-R, and a CD-RW. Other examples include magnetic tape, a nonvolatile memory card, a ROM, and a DVD.

In this case, the actual program code read from the storage medium realizes the functionality of the above-described embodiment, and the storage medium that stores the program code constitutes the present invention.

Also, one method of supplying the program is a method of connecting to a website on the Internet using the browser of a client computer, and downloading the computer program of the present invention from the website to a recording medium such as an HDD. Alternatively, the program can be supplied by downloading a compressed file that includes an auto-install function to a recording medium such as a hard disk. Supply of the program can also be realized by splitting the program code constituting the program of the present invention into a plurality of files and downloading the respective files from different websites. In other words, the claims of the present invention also encompass a WWW server, ftp server or the like that allows a plurality of operators to download program files for realizing the functionality and processes of the present invention with use of a computer.

Also, the program of the present invention can be distributed to operators as an encrypted program stored on a storage medium such as a CD-ROM. In this case, operators that satisfy a predetermined condition can be allowed to download decryption key information from a website via the Internet. The encrypted program is executed and installed on a computer using the key information, thereby realizing the functionality and processes of the present invention.

Also, in addition to a computer reading out and executing the program code, an OS or the like that is running on a computer can perform part or all of the actual processing based on instructions in the program code, thereby realizing the functionality and processes of the present invention.

Furthermore, the program code read from the storage medium can be written to a memory provided in a function expansion board inserted in a computer or a function expansion unit connected to a computer. In this case, a CPU or the like provided in the function expansion board or the function expansion unit performs part or all of the actual processing based on instructions in the program code, thereby realizing the functionality and processes of the present invention.

Also, the present invention may be applied to a system constituted from a plurality of apparatuses, or may be applied to an apparatus constituted from a single device. Also, needless to say, the present invention is applicable in a case where the functionality and processes of the present invention are achieved by supplying the program to a system or apparatus. In this case, the system or apparatus can benefit from the effects of the present invention by reading the storage medium that stores the program expressed by software for achieving the present invention.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-113228 filed on Apr. 23, 2008, which is hereby incorporated by reference herein in its entirety.

The invention claimed is:

1. An image processing apparatus for sending image data to a designated transmission destination, comprising:
   an input unit that inputs image data;
   an acquisition unit that acquires function restriction information representing an image processing function, the function restriction information corresponding to any of a plurality of image processing functions, for restricting usage on a user-by-user basis;
   a determination unit that determines a restriction function among the plurality of image processing functions with respect to the image data input by the input unit, based on the function restriction information acquired by the acquisition unit and an image processing function that is realizable by a combination of the image processing apparatus and an apparatus other than the image processing apparatus;
   an adding unit that adds attribute information regarding the restriction function determined by the determination unit to the image data input by the input unit; and
   a send unit that sends the image data to which the attribute information regarding the restriction function has been added by the adding unit.

2. The image processing apparatus of claim 1, further comprising a display control unit that displays, on a display apparatus included in the image processing apparatus, a setting screen that allows a user who has instructed performance of an image processing function to perform setting related to usage of the image processing function, the setting screen reflecting restriction content that is based on the function restriction information acquired by the acquisition unit,
   wherein the send unit acquires information input via the setting screen and sends the image data input by the input unit.

3. The image processing apparatus of claim 1, further comprising a reading unit that reads an image on an original and generates image data expressing the image,
   wherein the adding unit adds attribute information indicating print prohibition to the image data input by the input unit from the reading unit.

4. The image processing apparatus of claim 3,
   wherein if the function restriction information acquired by the acquisition unit indicates that copying is to be prohibited, the adding unit adds attribute information indicating print prohibition to the image data input by the input unit from the reading unit.

5. The image processing apparatus of claim 1,
   wherein the acquisition unit acquires the function restriction information that corresponds to user information indicating a user who input the image data with use of the input unit.

6. The image processing apparatus of claim 1, further comprising:
   a conversion unit that converts the image data input by the input unit to a predetermined format; and a control unit that controls so as to prohibit selection, in the conversion unit, of a format for which the adding unit cannot add attribute information based on the restriction function determined by the determination unit.

7. A method for performing image processing in an image processing apparatus for sending image data to a designated transmission destination, the method comprising:

inputting image data;

acquiring function restriction information representing an image processing function, the function restriction information corresponding to any of a plurality of image processing functions, for restricting usage on a user-by-user basis;

determining a restriction function among the plurality of image processing functions with respect to the image data input in the inputting step, based on the function restriction information acquired in the acquiring step and an image processing function that is realizable by a combination of the image processing apparatus and an apparatus other than the image processing apparatus;

adding attribute information regarding the restriction function determined in the determining step to the image data input in the inputting step; and sending the image data to which the attribute information regarding the restriction function has been added in the adding step.

8. A non-transitory computer-readable storage medium storing a computer program for causing a computer to execute the image processing method according to claim 7.

* * * * *